United States Patent
Park

(10) Patent No.: US 11,244,695 B2
(45) Date of Patent: Feb. 8, 2022

(54) NOISE MANAGEABLE ELECTRONIC APPARATUS AND METHOD FOR CONTROLLING THE SAME

(71) Applicant: LG ELECTRONICS INC., Seoul (KR)

(72) Inventor: Yun Sik Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 16/694,881

(22) Filed: Nov. 25, 2019

(65) Prior Publication Data

US 2021/0065732 A1     Mar. 4, 2021

(30) Foreign Application Priority Data

Sep. 2, 2019   (KR) .................. 10-2019-0108234

(51) Int. Cl.
| | |
|---|---|
| *G10L 15/22* | (2006.01) |
| *G10L 21/0232* | (2013.01) |
| *G06N 20/00* | (2019.01) |
| *G10L 25/84* | (2013.01) |
| *H04L 12/28* | (2006.01) |
| *H04L 29/08* | (2006.01) |

(52) U.S. Cl.
CPC .......... *G10L 21/0232* (2013.01); *G06N 20/00* (2019.01); *G10L 15/22* (2013.01); *G10L 25/84* (2013.01); *H04L 12/282* (2013.01); *G10L 2015/223* (2013.01); *H04L 67/125* (2013.01)

(58) Field of Classification Search
CPC ................................ G10L 15/20; G10L 15/22
See application file for complete search history.

(56) References Cited

U.S. PATENT DOCUMENTS

| | | | |
|---|---|---|---|
| 9,098,467 B1* | 8/2015 | Blanksteen | G06F 3/167 |
| 2002/0105575 A1* | 8/2002 | Hinde | G10L 15/24 |
| | | | 348/14.01 |
| 2010/0088093 A1* | 4/2010 | Lee | G10L 15/22 |
| | | | 704/233 |
| 2015/0019215 A1* | 1/2015 | Shin | G10L 15/20 |
| | | | 704/233 |
| 2017/0178627 A1* | 6/2017 | Firby | G10L 25/60 |
| 2017/0201825 A1* | 7/2017 | Whyte | H04N 5/23296 |

FOREIGN PATENT DOCUMENTS

| | | |
|---|---|---|
| KR | 100998897 | 12/2010 |
| KR | 10-2019-0084566 | 7/2019 |

* cited by examiner

*Primary Examiner* — Jialong He
(74) *Attorney, Agent, or Firm* — Lee Hong Degerman Kang & Waimey

(57) ABSTRACT

According to the present disclosure, noises generated by electronic devices are measured in order to determine an electronic device which generates a noise by an electronic device located near a user in response to a noise management command generated by the user, and the operation of the electronic devices is controlled so that the measured noises are maintained as an appropriate noise, thereby maintaining the noises of the electronic devices at an appropriate level.

16 Claims, 7 Drawing Sheets

NOISE MANAGEABLE ELECTRONIC APPARATUS AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0108234, filed on Sep. 2, 2019, the contents of which are all hereby incorporated by reference herein in its entirety.

BACKGROUND

1. Technical Field

The present disclosure relates to a noise manageable electronic device and a method for controlling the same. More specifically, the present disclosure relates to a technology for controlling operation of an electronic device which generates noise when a user generates a noise management command.

2. Description of Related Art

The following description is only for the purpose of providing background information related to embodiments of the present disclosure, and the contents to be described do not necessarily constitute related art.

With the development of technology, various electronic devices (e.g., TVs, audios, washing machines, refrigerators, drying machines, etc.) have been popularized in offices and homes. Such electronic devices are typically provided with remote control devices (hereinafter referred to as remote controllers) to provide ease of use for users. Thus, most electronic devices are remotely and conveniently controlled and operated by users through remote controllers.

Recently, various services using voice recognition technology have been introduced in many fields with technological developments. Such voice recognition technology can be considered as a series of processes that understand and convert words spoken by a person into character information readable by a computer. A voice recognition service using the voice recognition technology may include a series of processes that recognize a users voice and provide appropriate services corresponding to the voice.

In particular, as an example of the voice recognition technology, electronic devices in homes or offices may be controlled by voice commands of users. Here, a user's voice and noise generated due to operation of surrounding electronic devices may be concurrently generated. In this case, the user's voice may not be correctly recognized, and thus control of an electronic device corresponding to a voice command of the user may not be performed normally.

Therefore, it is necessary to develop a technology for minimizing generated surrounding noise and performing the control of an electronic device according to a voice command of a user. Related Art 1 and Related Art 2 disclose voice recognition-based technologies.

Korean Patent Registration No. 10-0998897 (Related Art 1), entitled "HOME AUTOMATION SYSTEM FOR RECOGNIZING VOICE AND CONTROL METHOD OF ELECTRIC HOME APPLIANCES FOR THE SAME", discloses a technology for remotely controlling an electronic device in a home by using control command data achieved by converting a voice message of a mobile phone through an external server.

However, according to the above invention, a voice message for controlling a home appliance is transmitted using a mobile phone.

That is, Related Art 1 does not disclose a technology for minimizing generated surrounding noise and performing the control of an electronic device according to a voice command of a user.

Korean Patent Application Laid-open Publication No. 10-2019-0084566 (Related Art 2), entitled "LAUNDRY TREATING APPARATUS CONTROL SYSTEM BY VOICE RECOGNITION AND OPERATING METHOD OF THE SAME", discloses a technology for easily controlling and monitoring a laundry treating apparatus by recognizing and processing a natural language from a voice speech of a user by receiving a voice command constructed with a natural language, recognizing a voice and setting an operation corresponding to a voice command, and outputting, as a voice, a guide comment about the operation.

According to the above invention, the operation of a laundry treating apparatus may be controlled by recognizing and processing a natural language from a voice speech of a user and analyzing an intention of a voice command of the user, and furthermore, a response to a user's request may be output, and a guidance may be provided according to an operation state.

That is, Related Art 2 does not disclose a technology for minimizing generated surrounding noise and performing the control of an electronic device according to a voice command of a user.

Therefore, it is necessary to develop a technology for correctly performing the control of an electronic device corresponding to a voice command of a user by accurately recognizing the voice command of the user by controlling operation of an electronic device that generates noise among surrounding electronic devices when the voice command is generated.

The above information disclosed in this Background section is provided only for enhancement of understanding of the background of the present disclosure and therefore it may contain information that does not form the prior art that is already known in this country to a person of ordinary skill in the art.

SUMMARY OF THE INVENTION

An aspect of the present disclosure is to improve a function of recognizing a management command generated by a user.

Another aspect of the present disclosure is to determine an electronic device which generates a noise by an electronic device located near a user in response to a noise management command generated by the user.

Another aspect of the present disclosure is to measure a noise generated by an electronic device and control operation of the electronic device so that the measured noise can be maintained as an appropriate noise.

The objective of the present disclosure is not limited to the above-mentioned objectives and other objectives and aspects of the present disclosure which are not mentioned can be understood by the following description, and will be more clearly understood by the embodiments of the present disclosure. It is also to be understood that the aspects of the present disclosure may be realized by means and combinations thereof set forth in claims.

According to a method of controlling an electronic device according to an embodiment of the present disclosure, an electronic device may be controlled through a process of receiving a noise management command from a user, determining a location of the user through a camera disposed in a home or a reception route of the command, activating a microphone of a voice reception device adjacent to the location of the user, collecting a noise through the microphone, determining a first electronic device which has generated the noise among a plurality of electronic devices in the home by analyzing the collected noise, and reducing the noise by controlling operation of the first electronic device.

In detail, when determining the first electronic device, levels (dB) of operation noises generated by the plurality of electronic devices may be measured through the microphone, and then an operation noise having a highest level among the operation noises generated by the plurality of electronic devices may be extracted. Here, an electronic device which generates the operation noise having the highest level is determined as the first electronic device.

Furthermore, when measuring the levels of the operation noises, the level of at least one operation noise among a wind noise, a vibration noise, a suction noise, and an acoustic noise generated when the plurality of electronic devices operate may be measured. That is, various noises that may be generated by electronic devices are measured.

When determining the first electronic device, the operation of an electronic device which is in operation and closest to the user may be controlled if it fails to determine the electronic device which generates the operation noise having the highest level.

In detail, when determining the first electronic device, a controlled noise may be measured through the microphone after controlling the operation of the electronic device which is in operation and closest to the user, and then operation of an electronic device having highest power consumption among the plurality of electronic devices may be controlled if a difference between a magnitude of the controlled noise and a magnitude of the collected noise is less than a threshold value.

Furthermore, when determining the first electronic device, if it fails to determine the electronic device which generates the operation noise having the highest level, operation of any one of the plurality of electronic devices may be controlled, and the levels of the operation noises of the plurality of electronic devices except for the any one electronic device may be measured, and then a noise level having a highest level among the operation noises generated by the plurality of electronic devices may be extracted on the basis of the measured levels.

Here, an electronic device which generates the noise having the highest level is determined as the first electronic device.

Meanwhile, before receiving the noise management command from the user, an input of a learning data set in which operation noises generated in each operation stage of the plurality of electronic devices when the plurality of electronic devices operate are labeled is received, and on the basis of the learning data set, a machine learning model for determining a stages of operation noises of the plurality of electronic devices generated during operation of the plurality of electronic devices is trained, and then the machine learning model generated through the training is stored as an operation noise determination program of the plurality of electronic devices.

That is, the noise of the electronic device which generates a loudest noise may be distinguished on the basis of learned operation noises of electronic devices.

A noise manageable electronic device in a home according to an embodiment of the present disclosure may include a receiver, which receives a noise management command from a user, a location determiner, which determines a location of the user through a camera disposed in a home or a reception route of the command, a collector, which activates a microphone of a voice reception device adjacent to the location of the user, and collects a noise through the activated microphone, a noise source determiner, which determines a first electronic device which has generated the noise among a plurality of electronic devices in the home by analyzing the collected noise, an operation controller, which reduces the noise by controlling operation of the first electronic device, a memory in which information about operation noises of the plurality of electronic devices generated during operation of the plurality of electronic devices is stored, and a controller, which controls the memory and the operation controller.

In detail, the noise source determiner may include a level measurer, which measures levels (dB) of operation noises generated by the plurality of electronic devices through the microphone, and a noise extractor, which extracts an operation noise having a highest level among the operation noises generated by the plurality of electronic devices.

Here, an electronic device which generates the operation noise having the highest level is determined as the first electronic device.

Furthermore, the level measurer may measure the level of at least one operation noise among a wind noise, a vibration noise, a suction noise, and an acoustic noise generated when the plurality of electronic devices operate.

Here, the memory may train a machine learning model for determining a stages of operation noises of the plurality of electronic devices generated during operation of the plurality of electronic devices on the basis of a learning data set in which operation noises generated in each operation stage of the plurality of electronic devices are labeled when the plurality of electronic devices operate, and may store the machine learning model generated through the training as an operation noise determination program of the plurality of electronic devices.

Therefore, the noise of the electronic device which generates a loudest noise may be distinguished on the basis of learned operation noises of electronic devices.

According to a method for noise management, receiving a command from a user located within a defined space, identifying a location of the user based on an input received from a camera that is configured to capture the user within the defined space, obtaining, after the receiving of the command, first noise captured by a microphone of a voice reception device located adjacent to the location of the user, identifying a first electronic device which has generated the first noise, from among a plurality of electronic devices within the defined space, by analyzing the first noise and controlling operation of the first electronic device to reduce the first noise.

And according to computer program product comprising a non-transitory machine readable medium having a computer readable program stored therein, wherein the computer readable program, when executed by a computing device, receive a command from a user located within a defined space, identify a location of the user based on an input received from a camera that is configured to capture the user within the defined space, obtain, after the receiving of the command, first noise captured by a microphone of a voice reception device located adjacent to the location of the user, identify a first electronic device which has generated the first noise, from among a plurality of electronic devices within the defined space, by analyzing the first noise and control operation of the first electronic device to reduce the noise.

Other aspects and features than those described above will become apparent from the following drawings, claims, and detailed description of the present disclosure.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
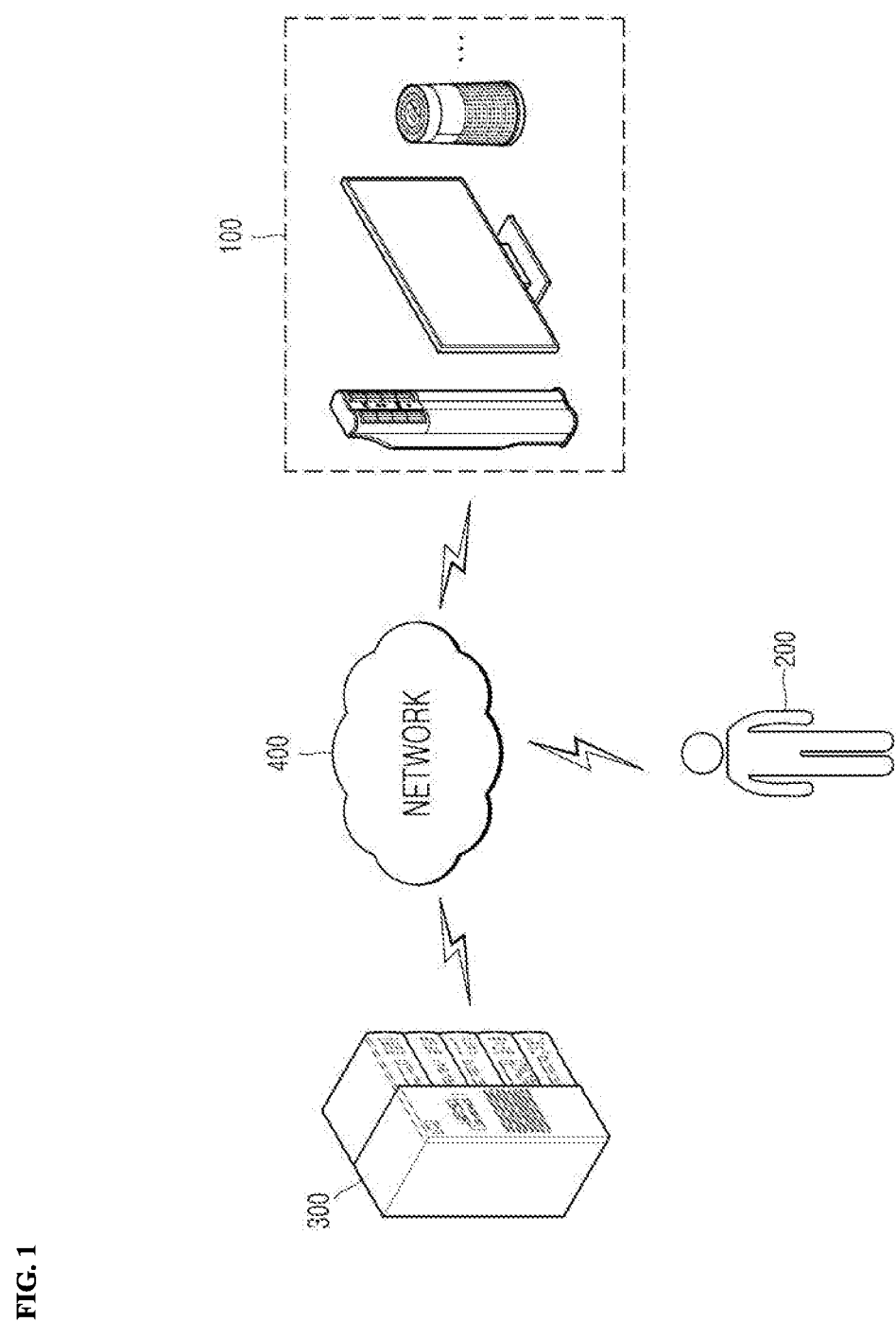
FIG. 1 is a diagram illustrating an electronic device in which a noise manageable electronic device is applied, a server, a user, and a network for connecting the foregoing elements according to an embodiment of the present disclosure.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. In addition, like reference numerals are used for like or similar components throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, a noise manageable electronic device capable of controlling operation of an electronic device that generates noise when a user generates a noise management command will be described with reference to the drawings.

FIG. 1 is a diagram illustrating an electronic device in which a noise manageable electronic device is applied, a server, a user, and a network for connecting the foregoing elements according to an embodiment of the present disclosure.

The noise manageable electronic device according to an embodiment of the present disclosure may communicate with a server 300 and an artificial intelligence speaker installed indoors (e.g., in a home, an office, or the like) via a communication network.

The noise manageable electronic device will be exemplarily described as being installed in a home. In an indoor place in which the noise manageable electronic device is disposed, an IoT environment may be constructed via 5G communication so that various electronic devices may communicate with each other.

The server 300 may determine a noise management command of a user, noise generated indoors, an electronic device that has generated noise, and the like using a microphone, a camera, and the like installed in an electronic device. A controller 160 of the electronic device may be controlled to control operation of the electronic device that has generated noise. That is, after the noise management command of the user is generated, the electronic device that has generated noise may be controlled by the server 300.

The network 400 may serve to connect the noise manageable electronic device and the server 300. The network 400 may include, for example, wired networks such as local area networks (LANs), wide area networks (WANs), metropolitan area networks (MANs), integrated service digital networks (ISDNs), and the like or wireless networks such as wireless LANs, CDMA, Bluetooth, satellite communication, and the like, but the scope of the present disclosure is not limited thereto.

Furthermore, the network 400 may transmit/receive information using short-range communications and/or long-distance communications. Examples of the short-range communication technologies may include Bluetooth, radio frequency identification (RFID), infrared data association (IrDA), ultra-wideband (UWB), ZigBee, and wireless fidelity (Wi-Fi). Examples of the long-range communication technologies may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include a connection of network elements such as a hub, a bridge, a router, a switch, and a gateway. The network 400 may include one or more connected networks, for example, a multi-network environment, including a public network such as an internet and a private network such as a safe corporate private network. The access to the network 400 may be provided via one or more wired or wireless access networks. Further, the network 400 may support 5G communication and/or an Internet of things (IoT) network for exchanging and processing information between distributed components such as objects.

The electronic device may receive the noise management command of the user instructed by voice through a camera, a microphone, or the like positioned indoors, or may transmit an operation state of the electronic device to the artificial intelligence speaker to notify the user by voice. Furthermore, the electronic device may be equipped with an artificial intelligence speaker, which recognizes a voice, to directly receive the noise management command of the user or notify a signal generated in the electronic device to the user via the artificial intelligence speaker.

Although the noise management command of the user is exemplarily described as being transmitted/received by voice in an embodiment of the present disclosure, the user may also transmit/receive the noise management command through a display, a confirm button, or the like installed in the electronic device to check noise management.

In addition, the electronic device may receive user's instructions via a terminal (e.g., a personal digital assistant, a tablet, a wearable device, etc.) of the user, or may deliver a signal generated in the electronic device to a user terminal.

This electronic device may be any one of various electronic devices such as an air conditioner, a refrigerator, a TV, a washing machine, etc. installed indoors, and an embodiment of the present disclosure is not limited by the type of the electronic device.

When the electronic device operates, noise such as an operation vibration may occur. At this time, the operation of the electronic device may be controlled according to the noise management command of the user to reduce the noise generated by the electronic device.

The operation control of an electronic device may be configured such that the operation of an electronic device that generates a loud noise among electronic devices in operation is controlled, for example, when the user makes a call, or generates the noise management command such as "it's noisy" or "reduce the noise".

Hereinafter, an embodiment in which operation of an electronic device that generates a noise is controlled will be described with reference to the accompanying drawings.

Figure 2:
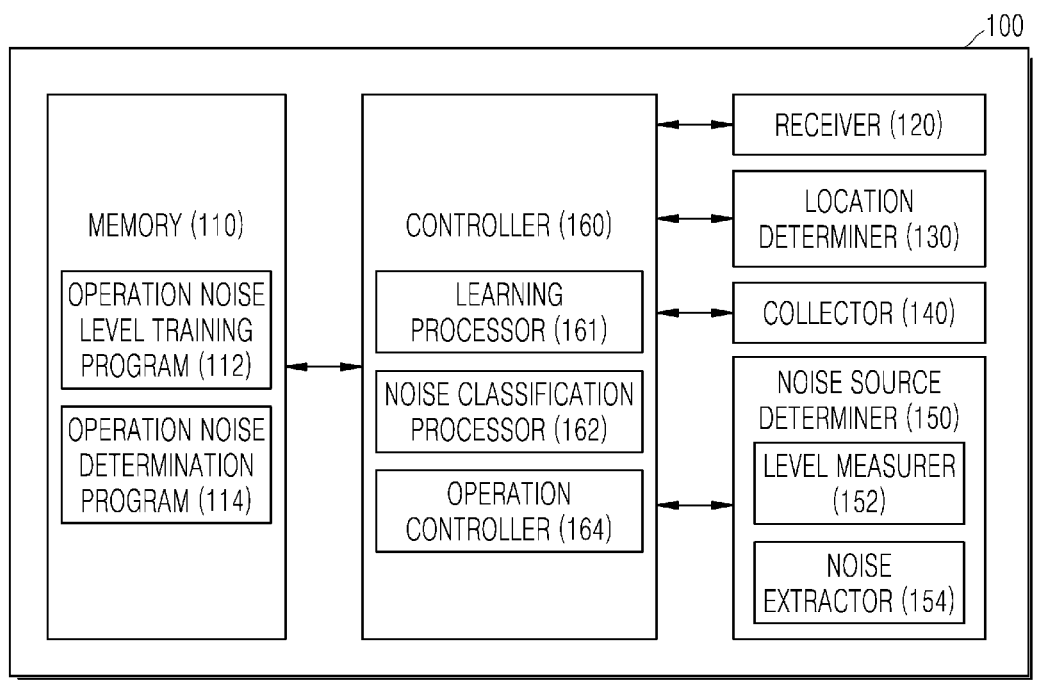
FIG. 2 is a schematic block diagram illustrating a noise manageable electronic device according to an embodiment of the present disclosure.
Figure 3:
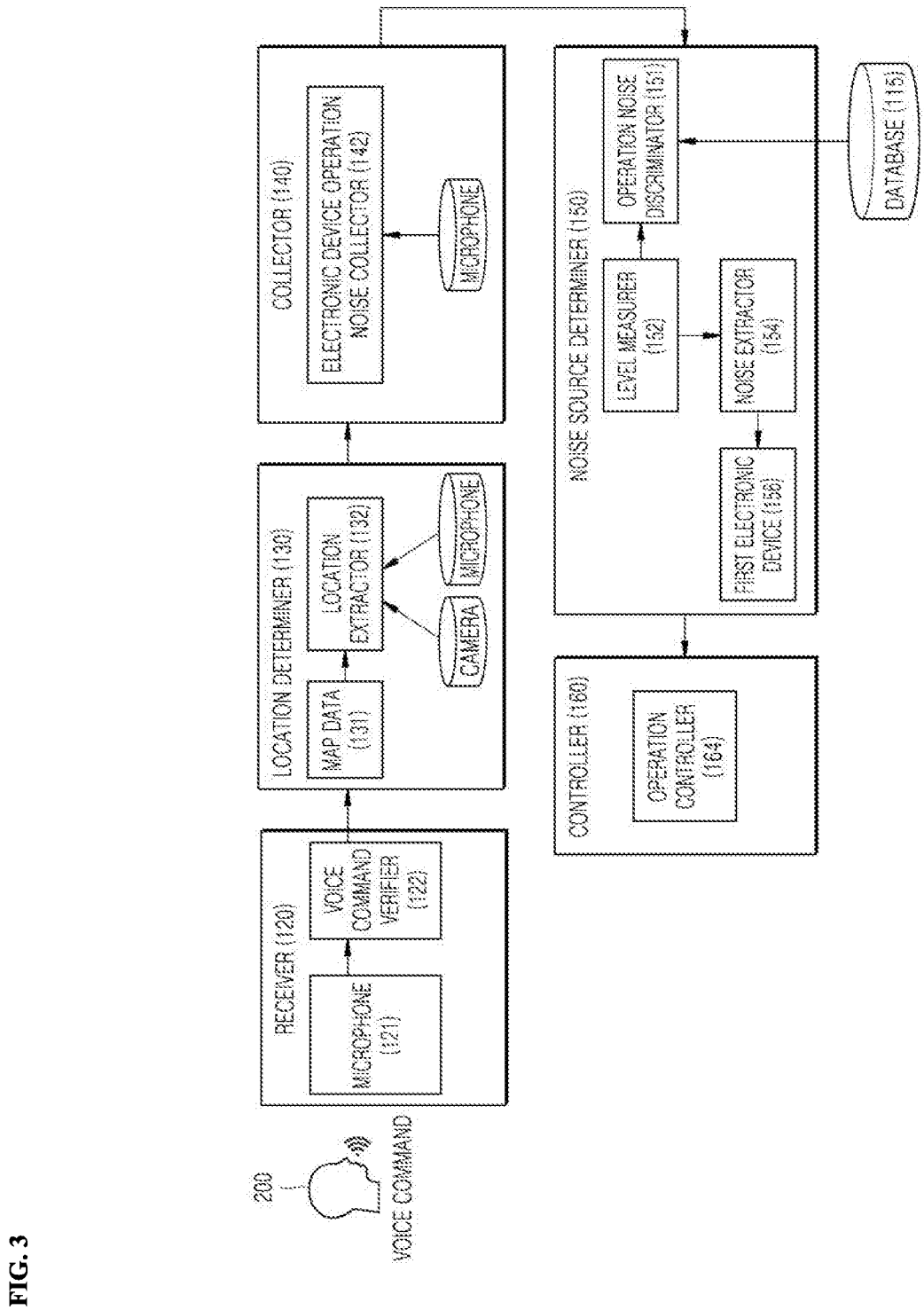
FIG. 3 is a block diagram specifically illustrating a configuration of the noise manageable electronic device of FIG. 2.

FIG. 2 is a schematic block diagram illustrating a noise manageable electronic device according to an embodiment of the present disclosure, and FIG. 3 is a block diagram specifically illustrating a configuration of the noise manageable electronic device of FIG. 2. In the following description, description of parts overlapping with those of FIG. 1 will be omitted.

A noise manageable electronic device 100 (see FIG. 1) according to an embodiment of the present disclosure may include a receiver 120, a location determiner 130, a collector 140, a noise source determiner 150, and a controller 160.

The receiver 120 may receive the noise management command of the user. To this end, the receiver 120 may include an artificial intelligence speaker, a microphone 121, and the like. It is necessary to verify whether a command received by the microphone 121 is the noise management command. To this end, the receiver 120 may further include a voice command verifier 122 for verifying a voice command generated by uttering the wording "it's noisy" by the user. The noise management command of the user may be collected via the receiver 120 installed in an electronic device, but may also be received via a receiver (not shown) of the noise manageable electronic device after being collected by an additional artificial intelligence (AI) speaker.

The location determiner 130 may determine a location of a user 200 (see FIG. 1) in which the noise management command has been generated. To this end, the location determiner 130 may include in-home map data 131 via a camera and CCTV arranged in a home, and a vision sensor and a microphone installed in an electronic device, and the like, may recognize objects around the user on the basis of the map data 131, and may determine the location of the user using a location extractor 132. For example, an image of an in-home map is captured through a camera disposed in a home, a vision sensor installed in an electronic device, or the like, and the location of the user is determined on the basis of the captured map.

Here, the camera may include: an image sensor (e.g., a CMOS image sensor) including at least one optical lens and a plurality of photodiodes (e.g., pixels) for forming an image by light that has passed through the optical lens; and a digital signal processor (DSP) for composing an image on the basis of signals output from the photodiodes. The digital signal processor may generate not only still images but also moving pictures composed of frames of still images.

Although it is exemplarily described that the location of the user is determined using a device for obtaining an image, such as a camera, a vision sensor, or the like, in an embodiment of the present disclosure, an artificial intelligence speaker, an ultrasonic sensor, or the like other than the device for obtaining an image may be used to analyze the location. For example, the location of the user may be measured on the basis of an amplification circuit of a microphone, or may be measured by measuring a time taken for an ultrasonic wave to return back after being emitted from an ultrasonic wave generation location by using an ultrasonic sensor installed in an electronic device.

The collector 140 may activate a microphone of a voice reception device adjacent to the location of the user, and may collect a noise through the activated microphone. To this end, the collector 140 may further include an electronic device operation noise collector 142 for collecting all of acoustic noise generated during operation, and collected acoustic noise may be classified as operation noises generated by each of a plurality of electronic devices using a noise classification processor 162 (see FIG. 3) of the controller 160.

When the collector 140 has collected a noise, the collected noise is analyzed by the noise source determiner 150, and then a first electronic device that has generated the noise among a plurality of electronic devices in a home may be determined.

Here, in order to analyze a noise, the noise source determiner 150 may include a level measurer 152 for measuring, through a microphone, levels (dB) of operation noises generated by a plurality of electronic devices and a noise extractor 154 for extracting an operation noise having a highest level among the operation noises generated by the plurality of electronic devices 100.

That is, an electronic device may generate a noise (e.g., a vibration noise, wind noise, acoustic noise, etc.) during operation, and the noise source determiner 150 may determine the type of the operation noise of each electronic device using an operation noise discriminator 151, and may extract a loudest operation noise among determined operation noises. Here, operation noise discrimination may be performed on the basis of a database 115 in which information about operation noises generated by respective electronic devices is stored.

Here, the level measurer 152 may measure a noise level of at least one among a wind noise, a vibration noise, a suction noise, and an acoustic noise generated during operation of a plurality of electronic devices.

For example, the wind noise may be generated when an electronic device such as an air conditioner, an air purifier, or the like operates, and the vibration noise may be generated when an electronic device such as a washing machine, a drying machine, or the like operates. Furthermore, when a robot cleaner, a wireless cleaner, or the like operates, both the suction noise and the wind noise may be generated. In addition, a TV or an artificial intelligence (AI) speaker may generate the acoustic noise. The level measurer 152 may measure magnitudes of such noises.

As described above, once the types and levels of noises generated by electronic devices are measured, the loudest operation noise among the measured noises may be extracted by the noise extractor 154. The extracted loudest noise may be used as reference data for extracting a first electronic device 100c of the electronic devices (see FIG. 4) that generates a noise.

Once the noise source determiner 150 determines the first electronic device, a noise source may be blocked by controlling operation of the first electronic device through an operation controller 164. In detail, the noise source may be blocked by reducing a volume of the first electronic device or by temporarily stopping the first electronic device by controlling a motor thereof.

Here, operation noise information about a plurality of electronic devices may be stored in a memory 110 in order to control the operation of the first electronic device determined to generate a noise.

In detail, the memory 110 may store a learning data set in which operation noises generated in each of operation stages of plurality of electronic devices are labeled. For example, the level (dB) of the volume of a TV, the level (dB) of a wind noise generated according to a set temperature when an air conditioner is operated, and the like may be labeled and stored.

When a plurality of electronic devices operate, noises generated by each of the electronic devices during the operation thereof may be learned for each stage through a training program 112 on the basis of the stored learning data set. For example, the volumes of a TV ranging from a lowest volume to a highest volume may be learned, and the wind noise generated when an air conditioner is operated may be learned for each stage according to a set temperature.

A machine learning model trained through this learning may be stored in the memory 110 as an operation noise determination program 114 of a plurality of electronic devices. The magnitude of a noise generated by an electronic device may be determined on the basis of the operation noise determination program 114.

The memory 110, which stores a variety of information required for controlling an electronic device through the noise manageable electronic device, may include a volatile or nonvolatile recording medium. The recording medium is configured to store data readable by the control unit 160, and may include a hard disk drive (HDD), solid state disk (SSD), silicon disk drive (SDD), ROM, RAM, CD-ROM, a magnetic tape, a floppy disk, a light data storage device, and the like. The information stored in the memory 110 in the present embodiment will be described contextually appropriately according to situations.

Once the noise information about an electronic device is stored in the memory 110, learning of a noise of an electronic device may be performed through a learner (not shown) on the basis of the stored noise information.

The learning may be performed in an electronic device itself, or may be performed outside the electronic device, and only noise information derived as a result of the learning may be transferred to and stored in the electronic device.

It will be exemplarily described that information related to the noise information about an electronic device stored in the memory 110 is received from an external server (not shown). This server may be a database server, which provides big data required for applying a variety of artificial intelligence algorithms and data related to voice recognition. Furthermore, the server may include a web server or an application for remotely controlling an electronic device via a communicator (not shown) which communicates with a web browser or an application installed in the electronic device.

Artificial intelligence (AI) is an area of computer engineering science and information technology that studies methods to make computers mimic intelligent human behaviors such as reasoning, learning, self-improving, and the like.

In addition, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed Specifically, the Machine Learning can be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

Machine learning of the artificial neural network may include unsupervised learning and supervised learning.

Deep learning, which is a subfield of machine learning, enables data-based learning through multiple layers. Deep learning may represent a set of machine learning algorithms that extract core data from a plurality of data sets as the number of layers increases.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. The RNN is widely used in natural language processing, and can be effectively used to process time-series data that changes over time, and may construct an ANN structure by progressively extracting higher level features through multiple layers. The DBN may include a deep learning structure that is constructed by stacking the result of restricted Boltzman machine (RBM) learning in multiple layers. A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Further, the artificial neural network may be trained by adjusting weights of connections between nodes (if necessary, adjusting bias values as well) so as to produce a desired output from a given input. Also, the artificial neural network can continuously update the weight values through learning. Furthermore, methods such as back propagation may be used in training the artificial neural network.

The controller 160 may further include a learning processor 161 for training a machine learning model in the memory 110 and the operation controller 164 for controlling the operation of the first electronic device having a loudest noise on the basis of the operation noise determination program of a plurality electronic devices stored in the memory 110.

In detail, the noise source may be blocked by reducing a volume of the first electronic device or by temporarily stopping the first electronic device by controlling a motor thereof.

Here, the controller 160, which includes the operation controller 164 for controlling the operation of the first electronic device extracted as a noise source, may include any type of devices capable of processing data, such as a processor. Here, 'the processor' may, for example, refer to a data processing device embedded in hardware, which has physically structured circuitry to perform a function represented by codes or instructions contained in a program. As one example of the data processing device embedded in the hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

As described above, in a state in which an electronic device has learned information about the type and magnitude of a noise generated during operation of an electronic device, the location of the user may be determined using the noise management command generated by the user. Thereafter, surrounding noises are collected by activating a microphone of an electronic device near the user, and then the collected noises are analyzed to extract the first electronic device that generates a noise. The operation of the extracted first electronic device is controlled so as to minimize the noise.

Figure 4:
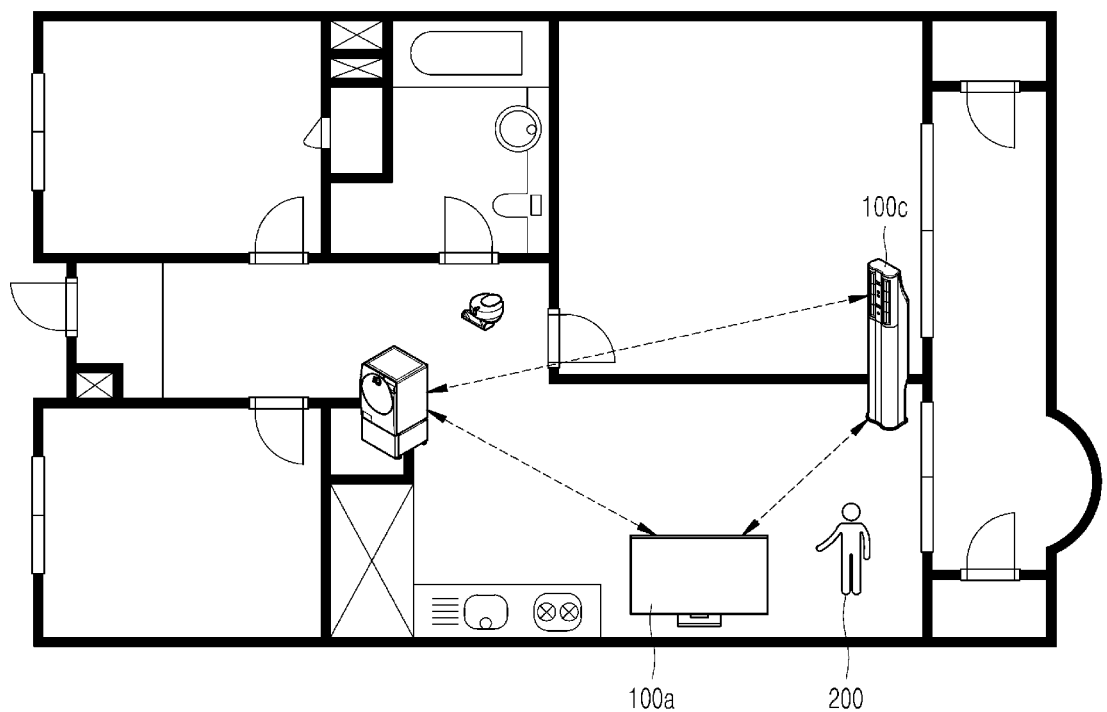
FIG. 4 is a diagram illustrating an example in which the operation of an electronic device is controlled through a noise manageable electronic device according to an embodiment of the present disclosure.

FIG. 4 is a diagram illustrating an example in which the operation of an electronic device is controlled through a noise manageable electronic device according to an embodiment of the present disclosure. In the following description, the common parts previously described with reference to FIGS. 1 to 3 will not be described, so as to avoid repetitive description.

Referring to FIG. 4, a plurality of electronic devices 100 (e.g., a TV, an air conditioner, a washing machine, a robot cleaner, etc., see FIG. 1) may be arranged and operated in a home. Here, the user 200 (see FIG. 1) may generate the noise management command such as "it's noisy" or "reduce the noise". The generated noise management command may be received by the receiver 120.

Thereafter, the location of the user in which the noise management command has been generated may be measured, and an artificial intelligence speaker or a microphone of an electronic device (e.g., an air conditioner 100c) adjacent to the user may be activated. The artificial intelligence speaker or the microphone of the electronic device adjacent to the user may collect operation noises of surrounding home appliances in operation.

When it is determined that the first electronic device having a highest noise level among the collected operation noises of the home appliances is a TV, the volume of the TV may be decreased or the TV may be turned off to block the noise source.

Meanwhile, when determining the first electronic device, it may fail to determine the electronic device that generates an operation noise having the highest level.

In this case, the operation of an electronic device which is in operation and closest to the user may be controlled. This is because the electronic device (e.g., the air conditioner 100c in the case of FIG. 4) closest to the user may be a noise source that gives a loudest noise to the user.

Furthermore, if it fails to determine the electronic device that generates an operation noise having the highest level when determining the first electronic device, after controlling the operation of the electronic device which is in operation and closest to the user, a controlled noise may be measured through a microphone, and then, if a difference between the magnitude of the controlled noise and the magnitude of a collected noise is less than a threshold value, the operation of an electronic device which consumes a large amount of power among a plurality of electronic devices may be controlled.

That is, it may be determined that the noise source has not been controlled when there is no difference between the magnitude of the noise collected before controlling the operation of the electronic device closest to the user and the magnitude of the noise after controlling the operation of the electronic device closest to the user. Therefore, in this case, the electronic device having highest power consumption among electronic devices in operation may be extracted to control the operation of the extracted electronic device. This is because an electronic device having higher power consumption may operate with higher performance and thus may generate a louder noise.

Alternatively, when it fails to determine the electronic device that generates an operation noise having the highest level, the operation of all of electronic devices in operation may be controlled (e.g., power off) so as to control a noise generation source.

In addition, when it fails to determine the electronic device that generates an operation noise having the highest level, the operation of one of electronic devices in operation may be controlled. That is, when it fails to determine an electronic device that is a noise generation source, any one of a plurality of electronic devices is controlled to determine whether a "noisy state" recognized by the user is maintained. When the "noisy state" recognized by the user is maintained after controlling any one of the plurality of electronic devices, an electronic device that is a noise source is extracted by repeatedly controlling one of the plurality of electronic devices.

As described above, the noise management command of the user may be generated, and the user location in which the noise management command has been generated may be determined. When the location of the user is determined, the levels of noises generated by surrounding electronic device may be measured by activating a microphone, an artificial intelligence speaker, or the like of an electronic device adjacent to the user. The operation of the first electronic device which generates a noise having the highest noise level among the measured noise levels may be controlled, or when it is difficult to measure the noise levels, the plurality of electronic devices may be controlled simultaneously or individually, thereby extracting the first electronic device that is a noise source and controlling the operation thereof. Accordingly, noise generation of indoor electronic devices may be minimized.

Figure 5:
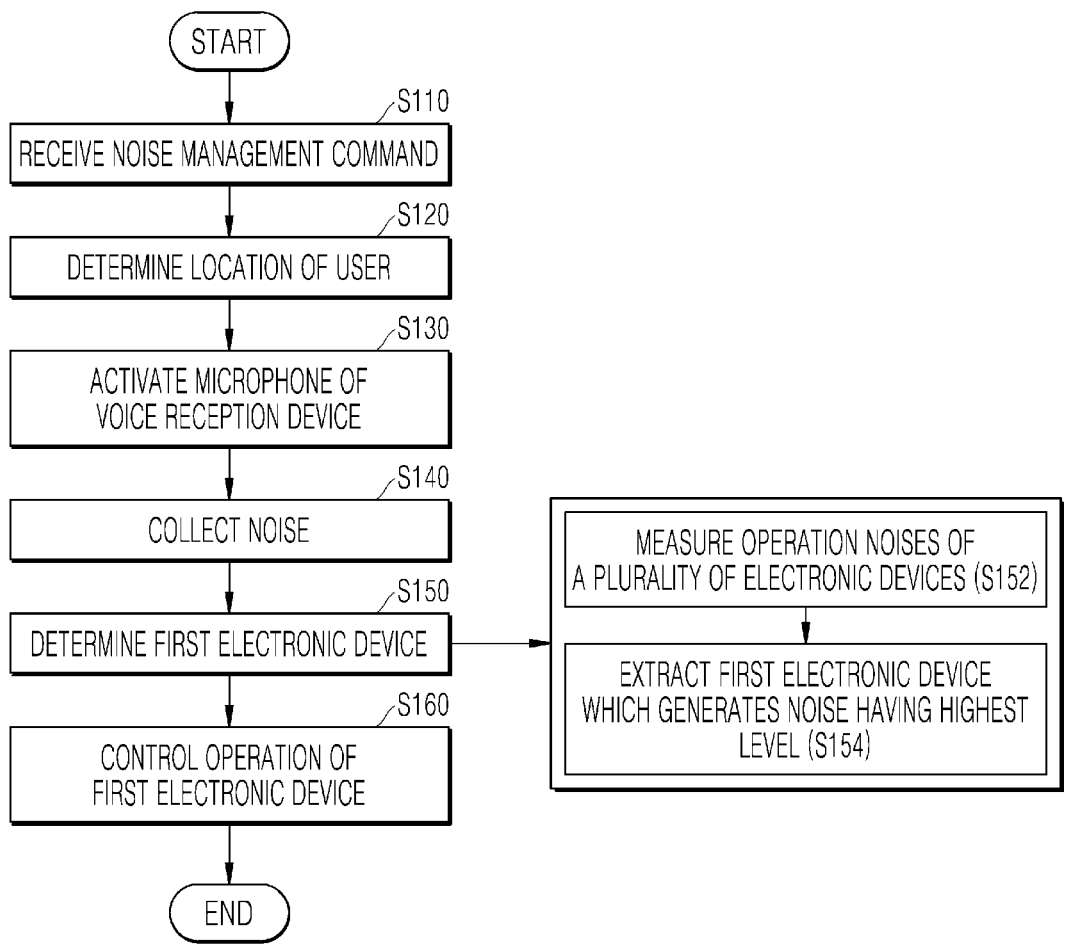
FIG. 5 is a flowchart illustrating a process of controlling the operation of an electronic device through a noise manageable electronic device according to an embodiment of the present disclosure.
Figure 6:
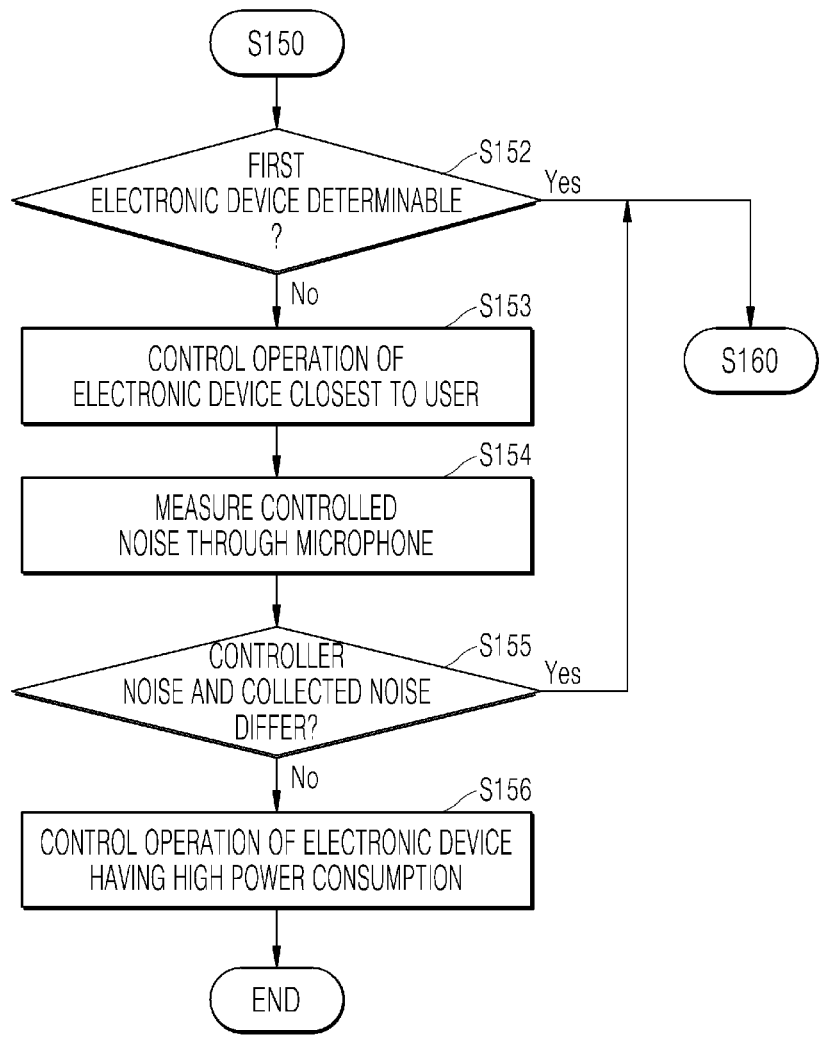
FIG. 6 is a flowchart illustrating another embodiment related to the operation of determining the location of a user of FIG. 5.
Figure 7:
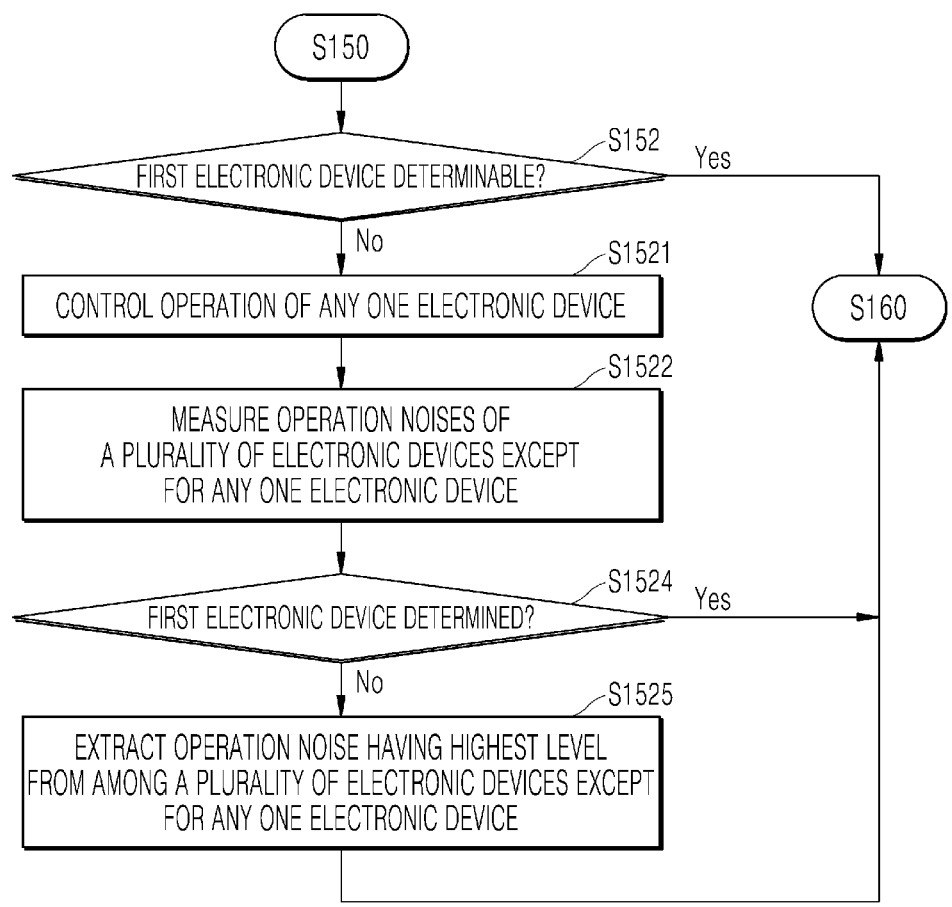
FIG. 7 is a flowchart illustrating another embodiment related to the operation of determining the location of a user of FIG. 5.

FIG. 5 is a flowchart illustrating a process of controlling the operation of an electronic device through a noise manageable electronic device according to an embodiment of the present disclosure, FIG. 6 is a flowchart illustrating another embodiment related to the operation of determining the location of a user of FIG. 5, and FIG. 7 is a flowchart illustrating another embodiment related to the operation of determining the location of a user of FIG. 5. In the following description, the description of parts that are the same as those in FIG. 1 to FIG. 4 will be omitted.

An electronic device according to an embodiment of the present disclosure includes a noise manageable electronic device capable of controlling operation of an electronic device that generates a noise when the user generates a noise management command.

When such an electronic device operates, a noise such as an operation vibration, an acoustic noise, or the like may occur. At this time, the operation of the electronic device may be controlled according to a command of the user to reduce the noise generated by the electronic device.

A process of controlling the operation of the electronic device using the noise manageable electronic device will be described in detail. First, a noise management command of the user, such as "it's noisy" or "reduce the noise", may be received (operation S110).

When the noise management command of the user has been generated, the location of the user in which the noise management command has been generated may be measured (operation S120). Here, the location of the user may be determined on the basis of an in-home map captured through a camera disposed in a home, a vision sensor installed in an electronic device, or the like.

When the location of the user is determined, an artificial intelligence speaker or a microphone of an electronic device (e.g., an air conditioner) adjacent to the user may be activated (operation S130). Such an artificial intelligence speaker or a microphone may be installed in an electronic device, and the installed artificial intelligence speaker or microphone may collect operation noises of surrounding home appliances in operation (operation S140).

When it is determined that a first electronic device having a highest noise level among the collected operation noises of the home appliances is a TV, the volume of the TV may be decreased or the TV may be turned off to block the noise source (operation S150).

In detail, the first electronic device may be extracted through a process in which the levels (dB) of operation noises of a plurality of electronic devices are measured through a microphone, and the electronic device that generates an operation noise having a highest noise level among the operation noises generated by the plurality of electronic devices is extracted (operations S152, S154).

That is, an electronic device may generate a noise (e.g., a vibration noise, wind noise, acoustic noise, etc.) during operation, and the type of the operation noise of each electronic device may be determined, and a loudest operation noise among determined operation noises may be extracted.

As described above, when a plurality of electronic devices operate, the electronic device that generates a loudest noise among generated operation noises may be determined as the first electronic device 100c (see FIG. 4) which generates a noise (operation S150).

Thereafter, the operation of the first electronic device may be controlled to block a noise source (operation S160). In detail, the noise source may be blocked by reducing a volume of the first electronic device or by temporarily stopping the first electronic device by controlling a motor thereof.

Meanwhile, when determining the first electronic device, it may fail to determine the electronic device that generates an operation noise having the highest level (operation S152). In this case, the operation of an electronic device closest to the user among electronic devices in operation may be controlled (operation S153).

Here, after controlling the operation of the electronic device closest to the user among the electronic devices in operation, a controlled noise may be measured through a microphone (operation S154). Thereafter, when a difference between the controlled noise and a previously collected operation noise of an electronic device is less than a threshold value, the operation of an electronic device having highest power consumption may be controlled (operations S155, S156).

That is, it may be determined that the noise source has not been controlled when there is no difference between the magnitude of the noise collected before controlling the operation of the electronic device closest to the user and the magnitude of the noise after controlling the operation of the electronic device closest to the user. Therefore, in this case, the electronic device having highest power consumption among electronic devices in operation may be extracted to control the operation of the extracted electronic device. This is because an electronic device having higher power consumption may operate with higher performance and thus may generate a louder noise.

Here, the threshold value may be determined on the basis of information stored as an appropriate noise in a memory, or may represent the magnitude of an appropriate noise stored by the user in advance.

Alternatively, when determining the first electronic device, if it fails to determine an electronic device that generates an operation noise having a highest level, the operation of any one of electronic devices in operation may be controlled (operations S152, S1521).

That is, when it fails to determine an electronic device that is a noise generation source through an artificial intelligence speaker, a microphone, or the like installed in an electronic device adjacent to the user, any one of a plurality of electronic devices is controlled to determine whether a "noisy state" recognized by the user is maintained.

For example, when it fails to determine an electronic device that is a noise generation source, the operation of an air conditioner among all of electronic devices may be controlled (operations S1521, S1522). Thereafter, the levels of operation noises of remaining electronic devices are measured, and then an operation noise having the highest level is extracted to determine the first electronic device that generates a noise (operations S1524, S1525).

When it fails to determine an electronic device that is a noise generation source, the first electronic device is determined through a process in which any one of the electronic devices other than the controlled air conditioner is controlled, and the levels of operation noises of remaining electronic devices are measured.

As described above, after determining the location of the user through the noise management command of the user, a noise of an electronic device around the user is extracted, and when the extracted noise has a noise level greater than or equal to an appropriate noise level, the operation of the electronic device that has generated the noise is controlled so as to block the noise generation source. Accordingly, inconvenience that is given to the user due to a noise may be minimized.

According to the present disclosure, the location of a user may be determined through a noise management command generated by the user, a voice recognition device near the location of the user may be activated, and then noises may be collected through the activated voice recognition device. Thereafter, the noises are analyzed, and the operation of a first electronic device which generates a noise louder than an appropriate noise among the analyzed noises is controlled so as to block a noise generation source. Accordingly, inconvenience that is given to the user due to a noise may be minimized.

Furthermore, when the noise management command of the user is generated, the user location in which the noise management command has been generated may be determined. When the location of the user is determined, the levels of noises generated by a plurality of electronic devices arranged in a home may be measured by activating a microphone, an artificial intelligence speaker, or the like of a voice recognition device of an electronic device adjacent to the user. When it is difficult to determine a first electronic device which generates a noise louder than an appropriate noise among the measured noises of the electronic devices, the operation of the electronic devices may be concurrently controlled so as to block a noise generation source.

Alternatively, when it is difficult to determine a first electronic device which generates a noise louder than an appropriate noise among the measured noises of the electronic devices, any one of the electronic devices is controlled, and then a noise level is measured, and if a noise louder than the appropriate noise is measured, the operation of the electronic devices except for the controlled electronic device is controlled, so as to block a noise source which generates a noise. Accordingly, a noise generated in a home may be blocked and thus inconvenience due to a noise may be minimized.

The example embodiments described above may be implemented through computer programs executable through various components on a computer, and such computer programs may be recorded on computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly conditions otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for noise management, the method comprising:
    receiving a command from a user located within a defined space;
    identifying a location of the user based on an input received from a camera that is configured to capture the user within the defined space;
    obtaining, after the receiving of the command, first noise captured by a microphone of a voice reception device located adjacent to the location of the user;
    identifying a first electronic device which has generated the first noise, from among a plurality of electronic devices within the defined space, by analyzing the first noise;
    controlling operation of the first electronic device to reduce the first noise,
    before the receiving the command from the user, receiving an input of a learning data set in which operation noises generated in each operation stage of the plurality of electronic devices are labeled when the plurality of electronic devices operate;
    training, on the basis of the learning data set, a machine learning model for determining a stage of operation noises of the plurality of electronic devices generated during operation of the plurality of electronic devices; and
    storing the machine learning model generated through the training as an operation noise determination program of the plurality of electronic devices.

2. The method of claim 1, further comprising:
    measuring (dB) levels of operation noises respectively generated by the plurality of electronic devices as captured by the microphone; and
    identifying an operation noise having a highest level from among the operation noises generated by the plurality of electronic devices,
    wherein an electronic device which generates the operation noise having the highest level is identified as the first electronic device.

3. The method of claim 2, wherein the measuring the dB levels of the operation noises comprises measuring a level of at least one operation noise among a wind noise, a vibration noise, a suction noise, or an acoustic noise generated when the plurality of electronic devices operate.

4. The method of claim 1, further comprising:
    measuring (dB) levels of operation noises respectively generated by the plurality of electronic devices as captured by the microphone;
    when the measured dB levels of operation noises does not result in identification of an operation noise having a highest level, the method further comprises:

controlling the operation of any one of the plurality of electronic devices;

measuring second levels of the operation noises respectively generated by the plurality of electronic devices except for the any one of the plurality of electronic devices, using the microphone;

identifying an operation noise level having a highest level among the second levels of operation noises based on the measuring the second levels; and identifying an electronic device which generates the operation noise having a highest level as the first electronic device.

5. The method of claim 1, further comprising:

identifying the location of the user in response to the receiving the command;

activating the microphone to enable the microphone to capture the first noise, wherein the defined space is a home, and wherein the command is a noise management command.

6. A method for noise management, the method comprising:

receiving a command from a user located within a defined space;

identifying a location of the user based on an input received from a camera that is configured to capture the user within the defined space;

obtaining, after the receiving of the command, first noise captured by a microphone of a voice reception device located adjacent to the location of the user;

identifying a first electronic device which has generated the first noise, from among a plurality of electronic devices within the defined space, by analyzing the first noise;

controlling operation of the first electronic device to reduce the first noise, measuring (dB) levels of operation noises respectively generated by the plurality of electronic devices as captured by the microphone; and identifying an electronic device, from among the plurality of electronic devices, that is located closest to the user as the first electronic device, when the measured dB levels of operation noises does not result in identification of an operation noise having a highest level.

7. The method of claim 6, further comprising:

measuring a second noise obtained by the microphone after the controlling the operation of first electronic device; and controlling operation of an electronic device having a highest power consumption, from among the plurality of electronic devices, when a difference between a magnitude of the first noise and a magnitude of the second noise is less than a threshold value.

8. A computer program product comprising a non-transitory machine readable medium having a computer readable program stored therein, wherein the computer readable program, when executed by a computing device, causes the computing device to:

receive a command from a user located within a defined space;

identify a location of the user based on an input received from a camera that is configured to capture the user within the defined space;

obtain, after the receiving of the command, first noise captured by a microphone of a voice reception device located adjacent to the location of the user;

identify a first electronic device which has generated the first noise, from among a plurality of electronic devices within the defined space, by analyzing the first noise;

control operation of the first electronic device to reduce the noise;

before the receive the command from the user, receive an input of a learning data set in which operation noises generated in each operation stage of the plurality of electronic devices are labeled when the plurality of electronic devices operate;

train, on the basis of the learning data set, a machine learning model for determining a stage of operation noises of the plurality of electronic devices generated during operation of the plurality of electronic devices; and store the machine learning model generated through the training as an operation noise determination program of the plurality of electronic devices.

9. The computer program product of claim 8, wherein the computer readable program, when executed by the computing device, further causes the computing device to:

measure (dB) levels of operation noises respectively generated by the plurality of electronic devices as captured by the microphone; and extract an operation noise having a highest level from among the operation noises generated by the plurality of electronic devices, wherein an electronic device which generates the operation noise having the highest level is identified as the first electronic device.

10. The computer program product of claim 9, wherein the measure the dB levels of the operation noises comprises measure a level of at least one operation noise among a wind noise, a vibration noise, a suction noise, or an acoustic noise generated when the plurality of electronic devices operate.

11. The computer program product of claim 8, wherein the computer readable program, when executed by the computing device, further causes the computing device to:

measure (dB) levels of operation noises respectively generated by the plurality of electronic devices as captured by the microphone; and identify an electronic device, from among the plurality of electronic devices, that is located closest to the user as the first electronic device, when the measured dB levels of operation noises does not result in identification of an operation noise having a highest level.

12. The computer program product of claim 11, wherein the computer readable program, when executed by the computing device, further causes the computing device to:

measure a second noise obtained by the microphone after the control the operation of the first electronic device; and control operation of an electronic device having a highest power consumption, from among the plurality of electronic devices, when a difference between a magnitude of the first noise and a magnitude of the second noise is less than a threshold value.

13. The computer program product of claim 8, wherein the computer readable program, when executed by the computing device, further causes the computing device to:

measure (dB) levels of operation noises respectively generated by the plurality of electronic devices as captured by the microphone;

when the measured dB levels of operation noises does not result in identification of an operation noise having a highest level, the computer readable program, when executed by the computing device, further causes the computing device to:

control the operation of any one of the plurality of electronic devices;

measure second levels of the operation noises respectively generated by the plurality of electronic devices, except for the any one of the plurality of electronic devices, using the microphone;

identify an operation noise level having a highest level among the second levels of operation noises based on the measuring the second levels; and identify an electronic device which generates the operation noise having a highest level as the first electronic device.

14. A noise management electronic device, comprising:

at least one processor configured to:

receive a command from a user located within a defined space, identify a location of the user based on an input received from a camera that is configured to capture the user within the defined space, obtain first noise captured by a microphone of a voice reception device located adjacent to the location of the user, identify a first electronic device which has generated the first noise, from among a plurality of electronic devices within the defined space, by analyzing the first noise, control operation of the first electronic device to reduce the first noise; and a memory in which information about operation noises of the plurality of electronic devices generated during operation of the plurality of electronic devices is stored, wherein the at least one processor is further configured to:

train a machine learning model for determining a stage of operation noises of the plurality of electronic devices generated during operation of the plurality of electronic devices on a basis of a learning data set in which operation noises generated in each operation stage of the plurality of electronic devices are labeled when the plurality of electronic devices operate, and store the machine learning model generated through the training as an operation noise determination program of the plurality of electronic devices in the memory.

15. The electronic device of claim 14, wherein the at least one processor is further configured to:

measure (dB) levels of operation noises respectively generated by the plurality of electronic devices as captured by the microphone; and extract an operation noise having a highest level among the operation noises generated by the plurality of electronic devices, wherein an electronic device which generates the operation noise having the highest level is identified as the first electronic device.

16. The electronic device of claim 15, wherein the at least one processor is further configured to measure the level of at least one operation noise among a wind noise, a vibration noise, a suction noise, or an acoustic noise generated when the plurality of electronic devices operate.

* * * * *